United States Patent
Nishida

(10) Patent No.: US 10,425,888 B2
(45) Date of Patent: Sep. 24, 2019

(54) WIRELESS COMMUNICATION APPARATUS AND METHOD OF CONTROLLING WIRELESS COMMUNICATION APPARATUS

(71) Applicant: SEIKO EPSON CORPORATION, Tokyo (JP)

(72) Inventor: Kota Nishida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/111,054

(22) Filed: Aug. 23, 2018

(65) Prior Publication Data

US 2019/0069230 A1    Feb. 28, 2019

(30) Foreign Application Priority Data

Aug. 25, 2017    (JP) ................................ 2017-162018

(51) Int. Cl.
| | |
|---|---|
| H04W 36/08 | (2009.01) |
| H04W 48/18 | (2009.01) |
| H04L 12/24 | (2006.01) |
| H04W 88/06 | (2009.01) |

(52) U.S. Cl.
CPC ......... *H04W 48/18* (2013.01); *H04L 41/0886* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 9,451,630 | B2* | 9/2016 | Chen ................. | H04W 72/1215 |
| 9,635,603 | B2* | 4/2017 | Cordeiro ............... | H04W 48/14 |
| 9,825,599 | B2* | 11/2017 | Kim ......................... | H03F 3/19 |
| 10,009,912 | B2* | 6/2018 | Abraham .......... | H04W 72/1215 |
| 10,070,474 | B2* | 9/2018 | Wietfeldt .............. | H04L 67/104 |
| 2016/0050683 | A1* | 2/2016 | Gupta ................... | H04W 24/02 370/329 |
| 2016/0353301 | A1* | 12/2016 | Kim ....................... | H04W 48/16 |
| 2016/0353382 | A1* | 12/2016 | Xue ................... | H04W 52/0251 |

FOREIGN PATENT DOCUMENTS

JP    2016-72729 A    5/2016

* cited by examiner

Primary Examiner — Tuan A Tran
(74) Attorney, Agent, or Firm — Workman Nydegger

(57) ABSTRACT

Provided is a wireless communication apparatus including an apparatus information obtaining unit that obtains apparatus information corresponding to an information processing apparatus with which the wireless communication apparatus communicates, a frequency band selection unit that selects, on a basis of the apparatus information, either one of a first frequency band and a second frequency band corresponding to higher frequency than the first frequency band, and a wireless communication unit that performs wireless communication with the information processing apparatus by using the selected frequency band.

11 Claims, 7 Drawing Sheets

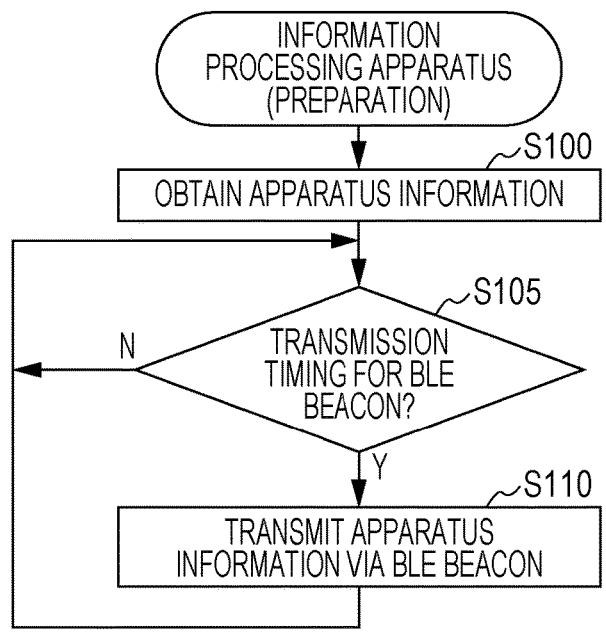

| | CH | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 2.4 GHz BAND | NUMBER OF SSIDs | 1 | 0 | 0 | 0 | 0 | 3 | 0 | 0 | 0 | 0 | 2 | 0 | 0 | 0 |

| | CH | 36 | 40 | 44 | 48 | 52 | 56 | 60 | 64 |
|---|---|---|---|---|---|---|---|---|---|
| 5.0 GHz BAND | NUMBER OF SSIDs | 1 | 0 | 2 | 0 | 0 | 0 | 1 | 0 |

WIRELESS COMMUNICATION APPARATUS AND METHOD OF CONTROLLING WIRELESS COMMUNICATION APPARATUS

BACKGROUND

1. Technical Field

The present invention relates to a wireless communication apparatus and a method of controlling the wireless communication apparatus.

2. Related Art

Conventionally, there is known an apparatus capable of performing wireless communication by using a plurality of frequency bands. For example, JP-A-2016-72729 discloses a printing apparatus capable of building Wi-Fi (registered trademark) connection by using a 2.4 GHz band and a 5.0 GHz band.

For a wireless communication apparatus and an information processing apparatus to perform wireless communication, the two need to perform wireless communication by using the same frequency band. Which frequency band the information processing apparatus supports is not necessarily clear to the wireless communication apparatus. In addition, in a configuration in which a user needs to recognize and set the frequency band that the information processing apparatus supports, it requires additional work to start wireless communication, which is not convenient.

SUMMARY

An advantage of some aspects of the invention is to provide a technique of automatically selecting a frequency band for wireless communication.

According to an aspect of the invention, a wireless communication apparatus including an apparatus information obtaining unit that obtains apparatus information corresponding to an information processing apparatus with which the wireless communication apparatus communicates, a frequency band selection unit that selects, on a basis of the apparatus information, either one of a first frequency band and a second frequency band corresponding to higher frequency than the first frequency band, and a wireless communication unit that performs wireless communication with the information processing apparatus by using the selected frequency band is provided. According to this configuration, the wireless communication apparatus can automatically select a frequency band corresponding to the information processing apparatus with which the wireless communication apparatus communicates.

Further, a configuration in which the apparatus information obtaining unit obtains the apparatus information including information about a frequency band that the information processing apparatus supports, and the frequency band selection unit selects the second frequency band in a case where the information processing apparatus supports the second frequency band, and selects the first frequency band in a case where the information processing apparatus does not support the second frequency band may be employed. According to this configuration, the wireless communication apparatus can perform wireless communication by preferentially using the second frequency band corresponding to higher frequency.

Further, a configuration in which the apparatus information obtaining unit obtains the apparatus information from the information processing apparatus in accordance with a wireless communication standard different from a wireless communication standard of the wireless communication unit may be employed. According to this configuration, a frequency band to be used for wireless communication by the wireless communication unit can be determined without performing wireless communication by the wireless communication unit.

Further, a configuration in which the frequency band selection unit selects the second frequency band in a case where a number of information processing apparatuses capable of performing wireless communication by using the first frequency band in accordance with the wireless communication standard different from the wireless communication standard of the wireless communication unit is equal to or greater than a reference number, and selects the first frequency band in a case where the number of the information processing apparatuses is smaller than the reference number may be employed. According to this configuration, a possibility of occurrence of radio wave interference can be reduced.

Further, a configuration in which the apparatus information obtaining unit obtains, as the apparatus information, a received signal strength of a radio wave transmitted from the information processing apparatus in accordance with the same wireless communication standard as the wireless communication unit, and the frequency band selection unit selects the second frequency band in a case where the received signal strength is equal to or greater than a predetermined value, and selects the first frequency band in a case where the received signal strength is smaller than the predetermined value may be employed. According to this configuration, the stability of wireless communication in the second frequency band can be improved.

Further, a configuration in which the apparatus information obtaining unit obtains the received signal strength by performing wireless communication with the information processing apparatus by using the first frequency band in accordance with the same wireless communication standard as the wireless communication unit may be employed. According to this configuration, the frequency band can be determined by actually measuring the received signal strength of the wireless communication by the wireless communication unit.

Further, a configuration in which the apparatus information obtaining unit obtains the received signal strength by performing wireless communication with the information processing apparatus by using the second frequency band in accordance with the same wireless communication standard as the wireless communication unit may be employed. According to this configuration, the frequency band can be determined by actually measuring the received signal strength of the wireless communication by the wireless communication unit.

Further, a configuration in which the wireless communication unit obtains, for each channel for wireless communication and by scanning access points that perform wireless communication by using the selected frequency band, a number of access points that perform wireless communication, and performs wireless communication by using a channel having the smallest number of access points that perform wireless communication may be employed. According to this configuration, a possibility of occurrence of radio wave interference can be reduced.

Further, a configuration in which the apparatus information obtaining unit obtains the apparatus information including information indicating whether or not the information processing apparatus supports channel bonding, and the wireless communication unit determines, on a basis of the apparatus information, whether or not the information processing apparatus supports channel bonding, selects a channel capable of channel bonding in a case where it has been determined that the information processing apparatus supports channel bonding, and selects the channel having the smallest number of access points that perform wireless communication in a case where it has been determined that the information processing apparatus does not support channel bonding may be employed. According to this configuration, a possibility that the speed of wireless communication is improved can be increased.

BRIEF DESCRIPTION OF THE DRAWINGS

The invention will be described with reference to the accompanying drawings, wherein like numbers reference like elements.

FIG. 2 is a flowchart of preparation in an information processing apparatus.

FIG. 3 shows an exemplary configuration of a Bluetooth Low Energy (BLE) beacon.

DESCRIPTION OF EXEMPLARY EMBODIMENTS

Exemplary embodiments of the invention will be described here in the following order:
1. Configuration of Wireless Communication Apparatus;
2. Configuration of Information Processing Apparatus;
3. Selection of Frequency Band;
3-1. Preparation;
3-2. Frequency Band Selection Process; and
4. Other Embodiments.

1. Configuration of Wireless Communication Apparatus

Figure 1:
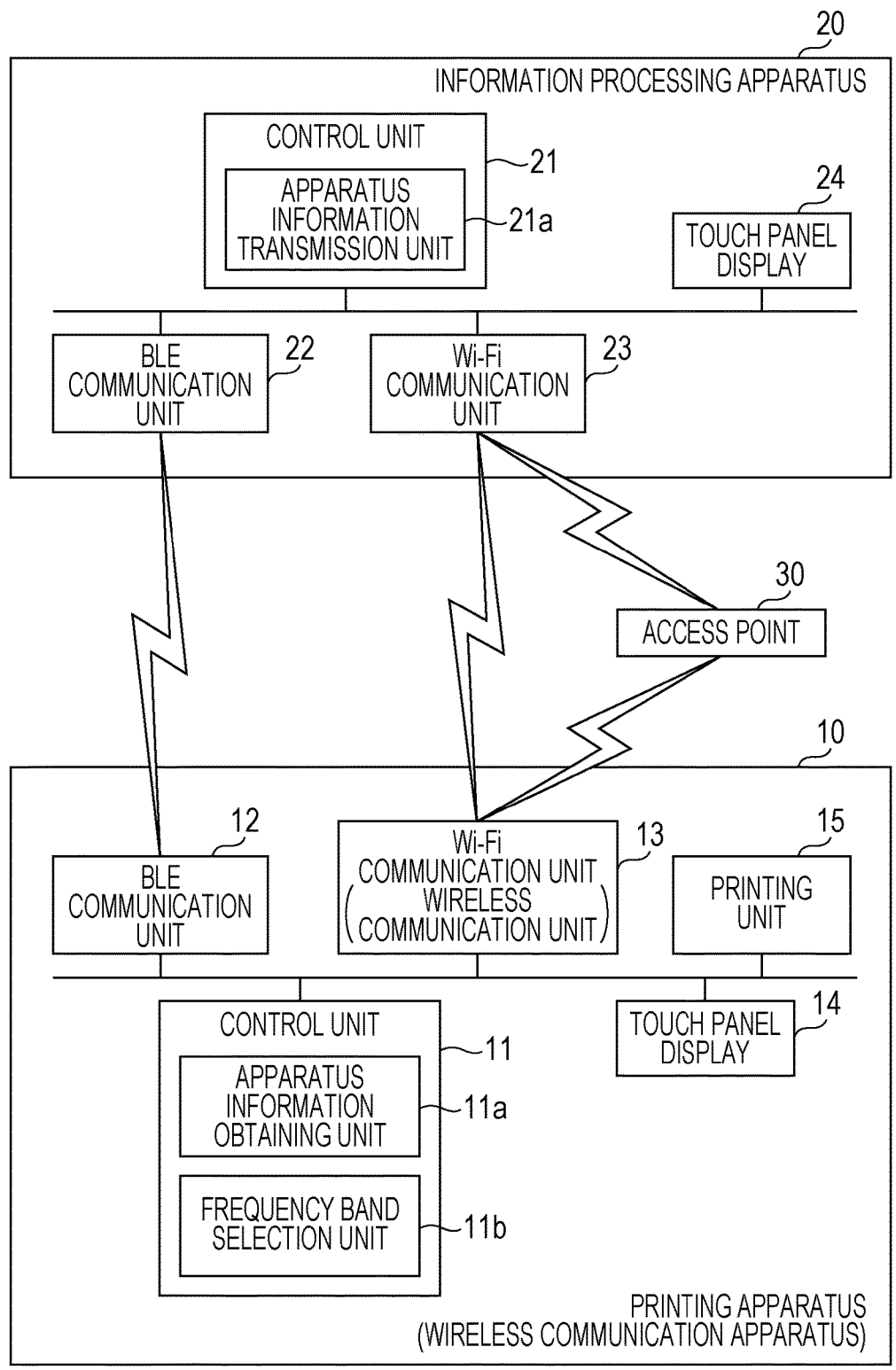
FIG. 1 is a block diagram according to an embodiment of the invention.

FIG. 1 shows a configuration of a printing apparatus 10 that functions as a wireless communication apparatus according to an embodiment of the invention. The printing apparatus 10 is capable of obtaining printing data from another apparatus through wireless communication. In the present embodiment, printing data is transmitted to the printing apparatus 10 from an information processing apparatus 20. The printing apparatus 10 and the information processing apparatus 20 are capable of performing wireless communication in accordance with two different wireless communication standards.

One of the two different wireless communication standards has a wider communication range and consumes more power than the other. In the present embodiment, the one wireless communication standard is a Wi-Fi standard (Wi-Fi Direct) and the other wireless communication standard is a Bluetooth Low Energy (BLE) standard (Bluetooth is a registered trademark) that is referred to as a short-distance wireless communication standard. Regarding these standards, a radio wave reaches a farther distance and more power is consumed in accordance with the Wi-Fi standard than in accordance with the BLE standard in most communication environments.

To be noted, an access point 30 can be present in the vicinity of the printing apparatus 10. Although only one information processing apparatus 20 and one access point 30 are shown in FIG. 1, the number of information processing apparatuses 20 may be an arbitrary number equal to or greater than 1, and the number of access points 30 may be an arbitrary number equal to or greater than 0. In the Wi-Fi standard, an infrastructure mode and an ad hoc mode are defined, and the printing apparatus 10 and the information processing apparatus 20 can perform wireless communication in both modes in the present embodiment. In the infrastructure mode, communication is performed via the access point 30. In the ad hoc mode, communication is performed not via the access point 30.

The printing apparatus 10 includes a control unit 11, a BLE communication unit 12, a Wi-Fi communication unit 13, a touch panel display 14, and a printing unit 15. The BLE communication unit 12 is capable of performing wireless communication with a device at a shorter distance with a lower power consumption than the Wi-Fi communication unit 13 in accordance with the BLE standard. The BLE communication unit 12 is configured as, for example, a chip or a module that performs wireless communication in accordance with the BLE standard. In addition, the BLE communication unit 12 included in the printing apparatus 10 in the present embodiment is capable of performing wireless communication using the 2.4 GHz band (first frequency band). To be noted, in the present embodiment, the BLE communication unit 12 communicates with the information processing apparatus 20. The BLE communication unit 12 may perform wireless communication with a device in accordance with Bluetooth 3.0 or an older wireless communication standard.

The Wi-Fi communication unit 13 is capable of performing wireless communication with a device in accordance with the Wi-Fi standard. The Wi-Fi communication unit 13 is configured as, for example, a chip or a module that performs wireless communication in accordance with the Wi-Fi standard. In addition, the Wi-Fi communication unit 13 included in the printing apparatus 10 in the present embodiment is capable of performing both of wireless communication using the 2.4 GHz band (first frequency band) and wireless communication using the 5.0 GHz band (second frequency band). To be noted, the Wi-Fi communication unit 13 corresponds to a wireless communication unit mentioned in the claims. In the present embodiment, the Wi-Fi communication unit 13 communicates with the information processing apparatus 20 or the access point 30.

The touch panel display 14 is a user interface having functions as a display capable of displaying various information and a touch panel that detects a touch on the display. The printing unit 15 includes a transport mechanism, a printing mechanism, and so forth that are not illustrated. The transport mechanism transports a printing medium, and the printing mechanism prints an image on the printing medium. Operations of the BLE communication unit 12, the Wi-Fi communication unit 13, the touch panel display 14, and the printing unit 15 are controlled by the control unit 11.

The control unit 11 includes a central processing unit (CPU) and a memory such as a read-only memory (ROM) or a random access memory (RAM) (the memory may be an electrically erasable programmable read-only memory (EEPROM)), and is capable of executing a program stored in the memory. That is, the control unit 11 controls the BLE communication unit 12, the Wi-Fi communication unit 13, the touch panel display 14, and the printing unit 15 by executing various programs. For example, the control unit 11 causes the touch panel display 14 to display an image by an image display program, and receives input on the touch panel display 14 from a user by an input reception program. In addition, by a printing control program, the control unit 11 performs image processing on an image represented by printing data on the basis of the printing data, and controls the printing unit 15 to print the image on a recording medium.

Further, the control unit 11 is capable of controlling the BLE communication unit 12 by a BLE communication program to perform wireless communication with the information processing apparatus 20 in accordance with the BLE standard. The control unit 11 is capable of controlling the Wi-Fi communication unit 13 by a Wi-Fi communication program to perform wireless communication with the information processing apparatus 20 in accordance with the Wi-Fi standard.

In the present embodiment, the control unit 11 is capable of realizing various functions by various programs. The programs for realizing the various functions may be separate programs, or a program may be integrated with another program. For example, the BLE communication program and the Wi-Fi communication program may be integrated with the printing control program executed by the control unit 11. In either case, the control unit 11 is capable of executing various functions by executing programs.

In the present embodiment, a SoftAP function is included as one of the functions. That is, the control unit 11 is capable of causing the printing apparatus 10 itself to function as an access point by executing the SoftAP function. In the case where the SoftAP function is executed, the control unit 11 can cause the printing apparatus 10 itself to function as an access point, and thus can perform wireless communication with the information processing apparatus 20 in accordance with the Wi-Fi standard without using the access point 30. To be noted, the SoftAP function is a function of realizing a function of a wireless local area network (LAN) access point by software.

In the present embodiment, the printing apparatus 10 is capable of using both of the 2.4 GHz band and the 5.0 GHz band to perform wireless communication. Therefore, before executing communication using the SoftAP function, the control unit 11 first selects a frequency band to be used for wireless communication. For selection of the frequency, the control unit 11 functions as an apparatus information obtaining unit 11a that obtains apparatus information corresponding to the information processing apparatus 20. In addition, the control unit 11 functions as a frequency band selection unit 11b that selects either one of the 2.4 GHz band and the 5.0 GHz band on the basis of the apparatus information.

2. Configuration of Information Processing Apparatus

The information processing apparatus 20 includes a control unit 21, a BLE communication unit 22, a Wi-Fi communication unit 23, and a touch panel display 24. The BLE communication unit 22 is capable of performing wireless communication with a device at a shorter distance with a lower power consumption than the Wi-Fi communication unit 23 in accordance with the BLE standard. The BLE communication unit 22 is configured as, for example, a chip or a module that performs wireless communication in accordance with the BLE standard. In addition, the BLE communication unit 22 included in the information processing apparatus 20 in the present embodiment is capable of performing wireless communication using the 2.4 GHz band (first frequency band). To be noted, in the present embodiment, the BLE communication unit 22 communicates with the printing apparatus 10. The BLE communication unit 22 may perform wireless communication with a device in accordance with Bluetooth 3.0 or an older wireless communication standard.

The Wi-Fi communication unit 23 is capable of performing wireless communication with a device in accordance with the Wi-Fi standard. The Wi-Fi communication unit 23 is configured as, for example, a chip or a module that performs wireless communication in accordance with the Wi-Fi standard. To be noted, in the present embodiment, a plurality of information processing apparatuses 20 may be present. In addition, specifications of the plurality of information processing apparatuses 20 can be different from one another. In the present embodiment, frequency bands supported by Wi-Fi communication units 23 provided in the information processing apparatuses 20 can be different from one another. That is, the information processing apparatuses 20 are capable of performing wireless communication by using either one or both of the 2.4 GHz band (first frequency band) and the 5.0 GHz band (second frequency band), and the supported frequency band can be different for each of the information processing apparatuses 20. To be noted, in the present embodiment, the Wi-Fi communication unit 23 communicates with the printing apparatus 10 or the access point 30.

The touch panel display 24 is a user interface having functions as a display capable of displaying various information and a touch panel that detects a touch on the display. Operations of the BLE communication unit 22, the Wi-Fi communication unit 23, and the touch panel display 24, are controlled by the control unit 21.

The control unit 21 includes a CPU and a memory such as a ROM or a RAM, and is capable of executing a program stored in the memory. That is, the control unit 21 controls the BLE communication unit 22, the Wi-Fi communication unit 23, and the touch panel display 24 by executing various programs. For example, the control unit 21 is capable of controlling the BLE communication unit 22 by a BLE communication program to perform wireless communication with the printing apparatus 10 in accordance with the BLE standard. The control unit 21 is capable of controlling the Wi-Fi communication unit 23 by a Wi-Fi communication program to perform wireless communication with the printing apparatus 10 in accordance with the Wi-Fi standard.

Further, the control unit 21 is capable of causing the printing apparatus 10 to perform printing by a printing program. Specifically, the control unit 21 displays candidates of an image to be printed on the touch panel display 24, and specifies the image to be printed on the basis of input on the touch panel display 24 provided by a user. In the present embodiment, the control unit 21 is capable of transmitting printing data indicating the image to be printed to the printing apparatus 10 via wireless communication of the Wi-Fi standard.

In order to execute this wireless communication, the control unit 21 controls the touch panel display 14 by the printing program to display a screen for a user to select a printing apparatus available for printing. The screen may be in various formats, in which network information (such as service set identifier: SSID) of a network to which the printing apparatus 10 to execute the printing belongs may be displayed as an option, an identification information (such as the name of the apparatus) of the printing apparatus 10 may be displayed as an option, or both of these may be displayed.

In any of these cases, the user selects the printing apparatus 10 to perform printing by an operation on the screen displayed the touch panel display 14, and the control unit 21 specifies the printing apparatus 10 to perform printing in accordance with the operation. When the printing apparatus 10 to perform printing is specified, the control unit 21 controls the Wi-Fi communication unit 23 to transmit the printing data to the printing apparatus 10 to perform printing. When the printing data is received by the printing apparatus 10, the control unit 11 controls the printing unit 15 on the basis of the printing data, and thus causes the printing unit 15 to print the image to be printed.

To be noted, the image to be printed may be obtained by an arbitrary method, and may be an image recorded in the memory, an image obtained from an external memory or computer via an unillustrated interface, or an image obtained from an external computer via a network.

In the present embodiment, the control unit 21 is capable of realizing various functions by various programs. The programs for realizing the various functions may be separate programs, or a program may be integrated with another program. For example, the BLE communication program and the Wi-Fi communication program may be integrated with the printing program executed by the control unit 21. In any of these cases, the control unit 21 is capable of, by executing a program, executing a function of transmitting the apparatus information to the printing apparatus 10 for the selection of frequency band, and this function is referred to as an apparatus information transmission unit 21a.

3. Selection of Frequency Band

As described above, in the present embodiment, printing data can be transmitted from the information processing apparatus 20 to the printing apparatus 10 via wireless communication. However, as described above, the frequency band supported by the information processing apparatus 20 in the Wi-Fi standard can be different for each information processing apparatus 20.

Further, the stability and communication speed of the wireless communication can vary depending on the environment in which the printing apparatus 10 and the information processing apparatus 20 are present, the distance between the apparatuses, and the like. That is, since the 5.0 GHz band corresponds to higher frequency than the 2.4 GHz band, generally, wireless communication of a higher speed can be performed in the 5.0 GHz band than in the 2.4 GHz band. Therefore, it is preferable that wireless communication in the 5.0 GHz band is selected in a good communication environment (environment with few obstructs and a short distance).

However, since the 5.0 GHz band corresponds to higher frequency than the 2.4 GHz band, generally, a radio wave does not reach a farther distance (has a narrower communicable range) in the 5.0 GHz than in the 2.4 GHz. Therefore, in the case where it is difficult to communicate a radio wave between the printing apparatus 10 and the information processing apparatus 20, for example, the stability of communication and the communication speed can decrease due to increase in the number of packets whose communication have failed or the like.

3-1. Preparation

In the present embodiment, the printing apparatus 10 performs preparation of obtaining information for selection of frequency band before the user performs the operation for printing on the information processing apparatus 20. The preparation is performed by using beacons (broadcast packets) transmitted in accordance with the BLE standard and the Wi-Fi standard.

In the preparation, the beacons are transmitted from the information processing apparatus 20 and the access point 30. When the information processing apparatus 20 is booted, the control unit 21 executes a process shown in FIG. 2 in the background (even when not explicitly instructed by the user). Specifically, the control unit 21 obtains apparatus information by the function of the apparatus information transmission unit 21a (step S100). In the present embodiment, the apparatus information include identification information unique to each information processing apparatus 20 and ability information indicating a form of communication that can be implemented on the information processing apparatus 20. In the present embodiment, the identification information is a media access control (MAC) address of the information processing apparatus 20. In the present embodiment, the ability information is information indicating a frequency band (either one or both of the 2.4 GHz band and the 5.0 GHz band) supported by the information processing apparatus 20 in the wireless communication according to the Wi-Fi standard and whether or not channel bonding is supported.

Next, the control unit 21 determines whether or not it is a transmission timing for the BLE beacon by the function of the apparatus information transmission unit 21a (step S105). That is, in the present embodiment, a predetermined BLE beacon is configured to be broadcasted at regular intervals, and the control unit 21 determines whether or not it is the transmission timing for the predetermined BLE beacon. In the case where it is not determined that it is the transmission timing for the BLE beacon in step S105, the control unit 21 repeats the determination of step S105.

In the case where it is determined that it is the transmission timing for the BLE beacon in step S105, the control unit 21 transmits the apparatus information via the BLE beacon by the function of the apparatus information transmission unit 21a (step S110). That is, the control unit 21 generates a BLE beacon including the apparatus information obtained in step S100. FIG. 3 schematically illustrates the BLE beacon. The BLE beacon is defined in the BLE standard, and includes a portion in which information according to a regular format such as header is described and a portion in which arbitrary information can be described. In the present embodiment, the apparatus information (MAC address, supported frequency band, and availability of channel bonding) is described in the portion in which the arbitrary information can be described.

When the BLE beacon is generated, the control unit 21 controls the BLE communication unit 22 to select a channel and broadcast the BLE beacon. As a result of this, the apparatus information is transmitted in such a manner that all devices present in the vicinity of the information processing apparatus 20 and capable of implementing communication in accordance with the BLE standard can receive the apparatus information. To be noted, the channel may be a predetermined channel, or a channel that is not crowded (the number of other information processing apparatuses 20 or the like using the channel is small) or the like may be selected.

The access point 30 is capable of executing a program by an unillustrated control unit, and the control unit executes a wireless communication control function by the program. In the present embodiment, the access point 30 is a wireless communication terminal capable of connecting to the information processing apparatus 20 and the printing apparatus 10. In the present embodiment, settings for network connection has been previously provided, and the access point 30 is capable of performing wireless communication with at least one terminal. Network information (SSID or the like) for reproducing the settings for network connection has been already recorded in an unillustrated recording medium in the access point 30.

Figure 4:
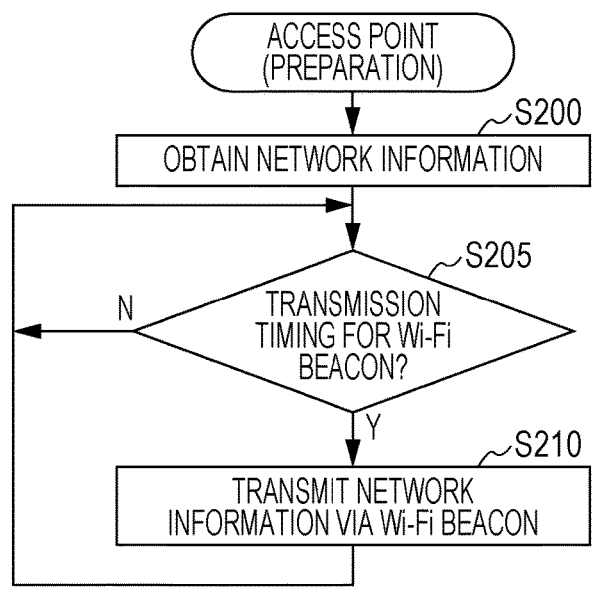
FIG. 4 is a flowchart of preparation in an access point.

When the access point 30 is activated, the access point 30 performs a process shown in FIG. 4. Specifically, the access point 30 obtains the network information by referring to the unillustrated recording medium (step S200). That is, the access point 30 obtains network information indicating a network that has been already set for the access point 30.

Next, the access point 30 determines whether or not it is a transmission timing for the Wi-Fi beacon (step S205). That is, in the present embodiment, a predetermined Wi-Fi beacon is configured to be broadcasted at regular intervals, and the access point 30 determines whether or not it is the transmission timing for the predetermined Wi-Fi beacon. In the case where it is not determined that it is the transmission timing for the Wi-Fi beacon in step S205, the access point 30 repeats the determination of step S205.

Figure 5:
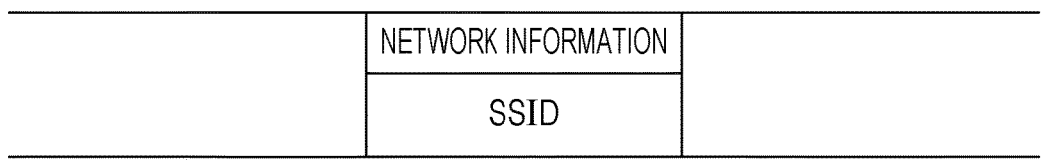
FIG. 5 shows an exemplary configuration of a Wi-Fi beacon.

In the case where it is determined that it is the transmission timing for the Wi-Fi beacon in step S205, the access point 30 transmits the network information via the Wi-Fi beacon (step S210). That is, the access point 30 generates a Wi-Fi beacon including the network information obtained in step S200. FIG. 5 schematically illustrates the Wi-Fi beacon. The Wi-Fi beacon is defined in the Wi-Fi standard, and the network information, that is, the SSID, is described in a portion in which information according to a regular format is described.

When the Wi-Fi beacon is generated, the access point 30 sets the SSID or the like by using the network information obtained in step S200, selects a channel, and broadcasts the Wi-Fi beacon. As a result of this, the network information is transmitted in such a manner that all devices present in the vicinity of the access point 30 and capable of implementing communication in accordance with the Wi-Fi standard can receive the network information. To be noted, the channel may be a predetermined channel, or a channel that is not crowded (the number of other access points or the like using the channel is small) or the like may be selected.

Figure 6:
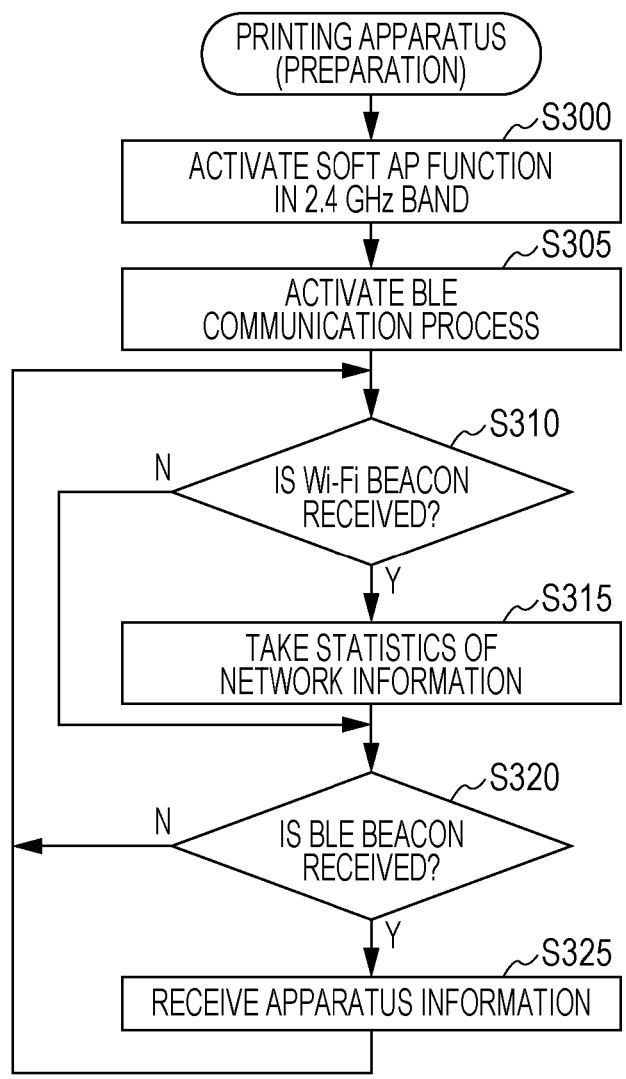
FIG. 6 is a flowchart of preparation in a printing apparatus.

As described above, in the case where the printing apparatus 10 is booted in a state in which the BLE beacon is transmitted at regular intervals from the information processing apparatus 20 and the Wi-Fi beacon is transmitted at regular intervals from the access point 30, the printing apparatus 10 performs a process shown in FIG. 6 by a function of the control unit 11.

Specifically, the control unit 11 activates a SoftAP function in the 2.4 GHz band by the function of the apparatus information obtaining unit 11a (step S300). That is, the control unit 11 causes the printing apparatus 10 to function as an access point by performing a predetermined process. As a result of this, the printing apparatus 10 starts functioning as an access point, and thus the printing apparatus 10 performs the process shown in FIG. 4 similarly to the access point 30. Therefore, also in the Wi-Fi communication unit 13 of the printing apparatus 10, the Wi-Fi beacon (shown in FIG. 5) in which the SSID is described is regularly output in the channel selected by the control unit 11. To be noted, although the printing apparatus 10 is also capable of wireless communication in the 5.0 GHz band, the printing apparatus 10 is configured to activate the SoftAP function in the 2.4 GHz supported by a greater number of terminals in this case, and the Wi-Fi beacon is transmitted in the 2.4 GHz band.

Specifically, the control unit 11 activates a BLE communication process by the function of the apparatus information obtaining unit 11a (step S305). As a result of this, the control unit 11 takes a state in which wireless communication according to the BLE standard can be performed via the BLE communication unit 12.

Next, the control unit 11 controls the Wi-Fi communication unit 13 to determine whether or not the Wi-Fi beacon has been received (step S310). That is, the Wi-Fi communication unit 13 scans all channels of the 2.4 GHz band and 5.0 GHz band defined in accordance with the Wi-Fi standard under the control of the control unit 11. In the case where the Wi-Fi beacon has been successfully received as a result of the scan, the control unit 11 determines that the Wi-Fi beacon has been received. That is, in the case where the Wi-Fi beacon transmitted from the access point 30 in the process shown in FIG. 4 is received by the printing apparatus 10, the network information included in the Wi-Fi beacon is obtained by the control unit 11. In the case where it is not determined in step S310 that the Wi-Fi beacon has been received, the control unit 11 skips step S315.

In the case where it is determined in step S310 that the Wi-Fi beacon has been received, the control unit 11 takes statistics of the network information (step S315). That is, the control unit 11 records the network information included in the received Wi-Fi beacon in an unillustrated memory in association with a channel through which the Wi-Fi beacon has been transmitted. Since the control unit 11 repeats step S310 after steps S320 and S325 that will be described later, network information of all (or most) of access points 30 present in the vicinity of the printing apparatus 10 will be obtained and recorded in the memory in association with the channel after a certain period of time.

The control unit 11 takes statistics on the basis of the network information recorded in the memory. That is, network information (SSID) associated with a certain channel being recorded indicates that an access point 30 that uses the channel is present. Further, different network information (SSID) being associated with the same channel indicates that different access points 30 uses the same channel. Therefore, the control unit 11 measures the number of different SSIDs (that is, the number of access points 30 that use the same channel) associated with the same channel, and records, in the memory, the result thereof as statistics of degree of crowdedness of each channel.

Figures 7, 8:
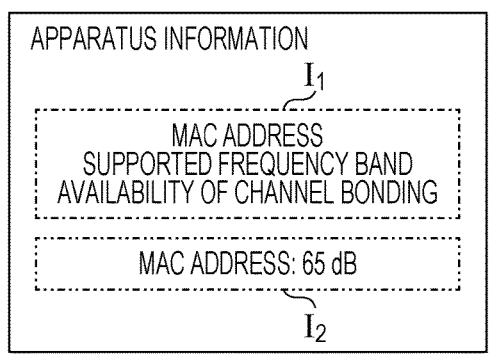
FIG. 7 shows an example of statistics of number of access points that use the same channel.
FIG. 8 shows an example of apparatus information.

FIG. 7 shows an example of results of statistics, and channels (CH) 1 to 14 are channels of the 2.4 GHz band, and channels 36 to 64 are channels of the 5.0 GHz band. To be noted, the channels available in the 5.0 GHz band are merely examples, and more channels may be available in the 5.0 GHz band. The number of SSIDs corresponds to the number of unique SSIDs associated with each channel. For example, FIG. 7 shows that the channel 6 is used by three access points 30.

In the case where the network information has been specified in step S315 or where it is not determined in step S310 that the Wi-Fi beacon has been received, the control unit 11 determines, by the function of the apparatus information obtaining unit 11a, whether or not the BLE beacon has been received (step S320). That is, the BLE communication unit 12 scans all channels of the 2.4 GHz band defined in accordance with the BLE standard under the control of the control unit 11.

In the case where the BLE beacon has been successfully received as a result of the scan, the control unit 11 obtains the apparatus information from the BLE beacon (step S325). That is, the control unit 11 records the apparatus information in the memory. Then, the control unit 11 repeats step S310 and subsequent steps. In the case where it is not determined in step S320 that the Wi-Fi beacon has been received, the control unit 11 skips step S325, and repeat step S310 and subsequent steps.

FIG. 8 shows an example of the apparatus information obtained in the present embodiment. To be noted, in FIG. 8, apparatus information obtained in the preparation is shown in an area enclosed by a one-dot chain line, and apparatus information obtained after the start of a frequency band selection process is shown in an area enclosed by a two-dot chain line. Specifically, in FIG. 8, an example in which apparatus information $I_1$ including a MAC address, a supported frequency band, and availability of channel bonding is obtained.

As described above, in the present embodiment, the control unit 11 obtains, by the function of the apparatus information obtaining unit 11a, apparatus information from the information processing apparatus 20 by using wireless communication of the BLE standard. Therefore, the control unit 11 is capable of obtaining apparatus information from the information processing apparatus 20 in accordance with a wireless communication standard different from the Wi-Fi standard. Since wireless communication according to the Wi-Fi standard generally consumes more power than wireless communication according to the BLE standard, in the present embodiment, the apparatus information can be obtained with a low power consumption as compared with a configuration in which the apparatus information is obtained via wireless communication according to the Wi-Fi standard.

3-2. Frequency Band Selection Process

Next, a process of the printing apparatus 10 selecting a frequency band for wireless communication according to the Wi-Fi standard when the information processing apparatus 20 transmits printing data to the printing apparatus 10 will be described. The selection of frequency band is performed by cooperation of the information processing apparatus 20 and the printing apparatus 10. In the present embodiment, a trigger of start of printing is provided by a user that uses the information processing apparatus 20.

Figure 9:
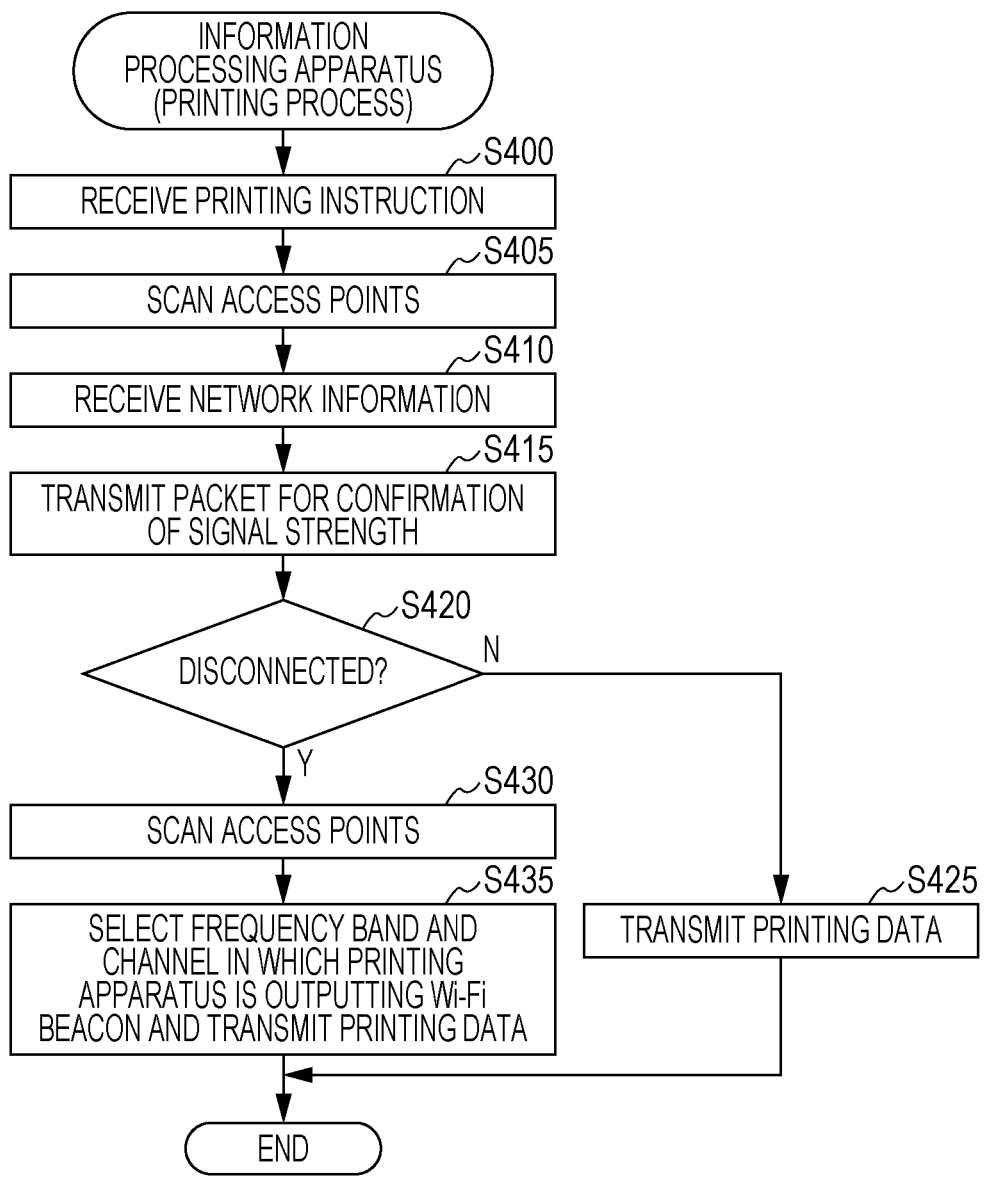
FIG. 9 is a flowchart of a printing process in the information processing apparatus.

That is, the user of the information processing apparatus 20 is capable of causing the printing apparatus 10 to print a desired image by executing the printing function (for example, by executing a printing application program) via the information processing apparatus 20. Specifically, a printing process shown in FIG. 9 is performed in the information processing apparatus 20.

In the printing process, the control unit 21 receives a printing instruction (step S400). That is, the control unit 21 receives designation of an image to be printed and an instruction of execution of printing via the touch panel display 24 from the user. Next, the control unit 21 scans access points (step S405). That is, the control unit 21 controls the Wi-Fi communication unit 23 to scan all channels in the 2.4 GHz band and determines whether or not a Wi-Fi beacon transmitted from an access point has been received. In the case where the Wi-Fi beacon has been received, the control unit 21 obtains the network information described in the Wi-Fi beacon, and specifies network information of access points present in the vicinity of the information processing apparatus 20.

In the present embodiment, since the printing apparatus 10 also functions as an access point as a result of processing of step S300, network information of the access point 30 and the printing apparatus 10 is obtained in the example shown in FIG. 1. In addition, the access point 30 and the printing apparatus 10 respectively transmit Wi-Fi beacons through channels selected by the access point 30 and the printing apparatus 10 themselves. Therefore, in the case where a Wi-Fi beacon is received as a result of the scan performed by the information processing apparatus 20, the information processing apparatus 20 can specify a channel used by each device together with network information set for each device.

Next, the control unit 21 receives an instruction of network information from the user (step S410). That is, the control unit 21 controls the touch panel display 24 to display network information (SSID) set for each device as an option. The user selects, on the basis of what is displayed on the touch panel display 24, the network information of a network to which the printing apparatus 10 to perform printing belongs. When the user selects network information via the touch panel display 24, the control unit 21 accepts the selected network information. To be noted, here, the printing apparatus 10 to perform printing is specified by selecting the network information. Therefore, options shown to the user may be in various formats, and, for example, a configuration in which apparatus names or the like of printing apparatuses 10 are provided as options may be employed.

When the network information of the network to which the printing apparatus 10 belongs is received, the information processing apparatus 20 becomes capable of performing wireless communication with the printing apparatus 10 belonging to the network in accordance with the Wi-Fi standard by using the channel through which the printing apparatus 10 has transmitted the Wi-Fi beacon. Therefore, the control unit 21 controls the Wi-Fi communication unit 23 to transmit a packet for confirmation of signal strength by using a radio wave of the 2.4 GHz band (step S415). Here, the packet for confirmation of signal strength is a packet for measuring the signal strength in the printing apparatus 10, and may be an arbitrary packet. In the present embodiment, the packet for confirmation of signal strength is a packet including a MAC address and various data defined in accordance with the Wi-Fi standard.

When the packet for confirmation of signal strength is transmitted and the signal strength of the radio wave is measured in the printing apparatus 10, collection of apparatus information corresponding to the information processing apparatus 20 is completed in the printing apparatus 10. As a result of this, the printing apparatus 10 selects either one of the 2.4 GHz band and the 5.0 GHz band on the basis of the apparatus information. Therefore, there is a possibility that the 5.0 GHz band, which is different from the 2.4 GHz band that has been used before, has been selected in this stage. In addition, even in the case where the 2.4 GHz band is selected in the printing apparatus 10, there is a possibility that the channel has been changed in processing of step S545 that will be described later. In step S545, a channel with the fewest access points is selected. The possibility of the channel being changed by this processing is small, but not zero.

The information processing apparatus 20 and the printing apparatus 10 are disconnected from each other in the case where the 5.0 GHz band has been selected and where the channel has been changed although the 2.4 GHz band has been selected as described above. Therefore, in the information processing apparatus 20, whether or not the two have been disconnected from each other is determined (step S420). In the case where it is not determined in step S420 that the two have been disconnected from each other, the connection is still not lost, and therefore the control unit 21 transmits the printing data to the printing apparatus 10 by using the connection. As a result of this, the printing apparatus 10 performs printing on the basis of the printing data. In contrast, in the case where it is determined in step S420 that the two have been disconnected from each other, the control unit 21 performs the scanning of network information again for performing setting in accordance with the change in the frequency band or the channel (step S430). That is, the control unit 21 controls the Wi-Fi communication unit 23 to scan all channels of the 2.4 GHz band and 5.0 GHz band. To be noted, although the scan of step S405 has been performed for the 2.4 GHz band, in step S430, the 5.0 GHz is also subjected to scanning because there is a possibility that the frequency band used by the printing apparatus 10 has been changed.

When the Wi-Fi beacon transmitted from the printing apparatus 10 is received as a result of the scan, the control unit 21 specifies the frequency band and channel in which the Wi-Fi beacon has been transmitted, and thus specifies the frequency band and channel in which the printing apparatus 10 outputs the Wi-Fi beacon. Then, the control unit 21 transmits the printing data by selecting the frequency band and channel in which the printing apparatus 10 outputs the Wi-Fi beacon (step S435). That is, the control unit 21 specifies the Wi-Fi beacon transmitted from the printing apparatus 10 among Wi-Fi beacons obtained in the scan of step S430. Whether or not the Wi-Fi beacon is transmitted from the printing apparatus 10 can be determined on the basis of, for example, whether or not the network information (SSID) described in the Wi-Fi beacon matches the information received in step S410.

When the Wi-Fi beacon transmitted from the printing apparatus is specified, the control unit 21 controls the Wi-Fi communication unit 23 to transmit the printing data to the printing apparatus 10 via wireless communication of the Wi-Fi standard by using the frequency band and channel in which the Wi-Fi beacon has been transmitted. As a result of this, the printing apparatus 10 performs printing on the basis of the printing data.

Figure 10:
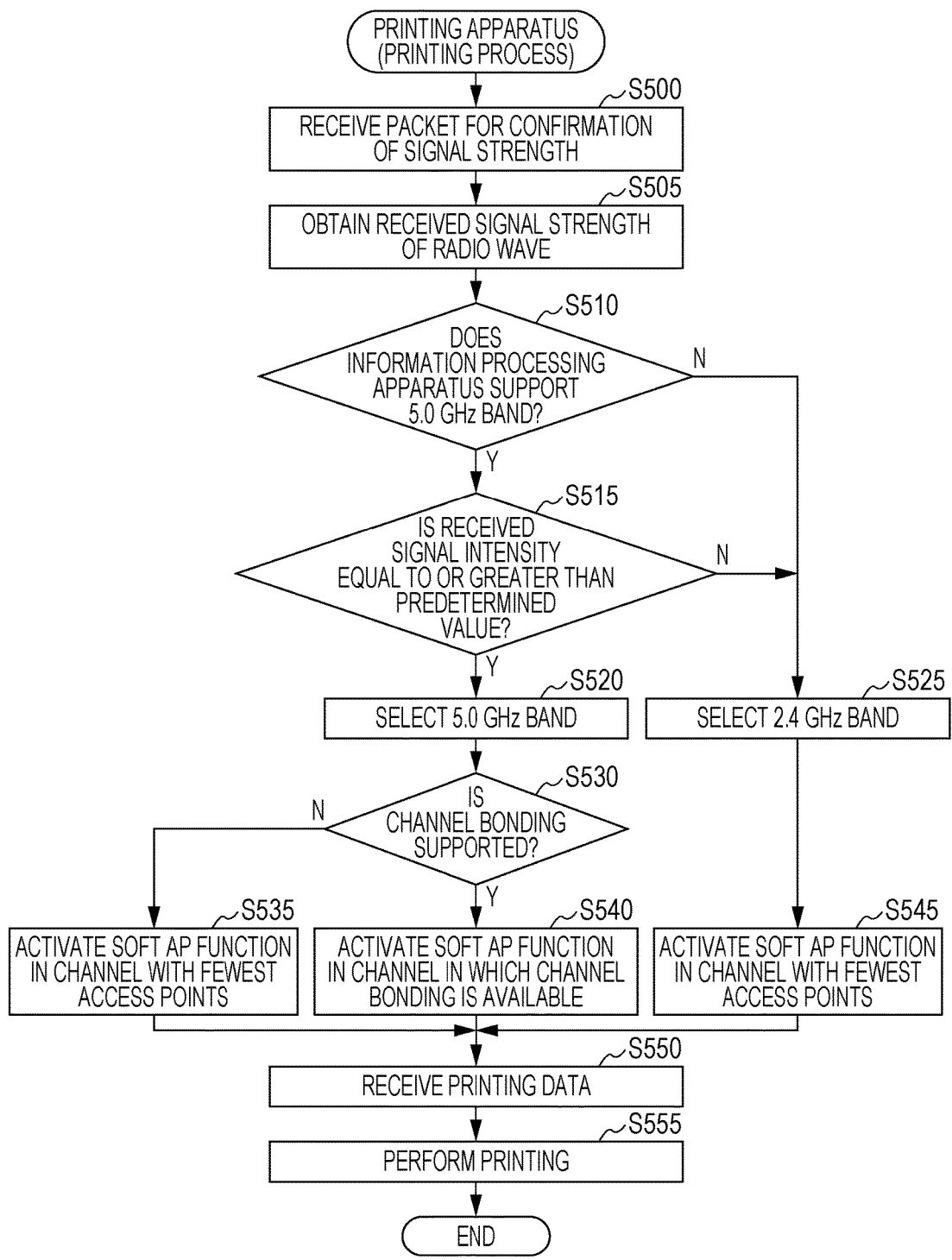
FIG. 10 is a flowchart of a printing process in the printing apparatus.

The printing apparatus 10 performs a printing process in accordance with the printing process of the information processing apparatus 20 described above, and, in the course of this process, the printing apparatus 10 selects a frequency band on the basis of the apparatus information of the information processing apparatus 20. FIG. 10 shows a printing process of the printing apparatus 10. In the printing apparatus 10, the printing process shown in FIG. 10 is performed in parallel with the process shown in FIG. 6.

In the printing process, the control unit 11 receives the packet for confirmation of signal strength by the function of the apparatus information obtaining unit 11a (step S500). That is, in step S415, the information processing apparatus 20 transmits the packet for confirmation of signal strength by using a radio wave of the 2.4 GHz band in accordance with the channel used by the printing apparatus 10. Therefore, the control unit 11 controls the Wi-Fi communication unit 13 to receive the packet. According to this configuration, the frequency band can be determined by actually measuring the received signal strength of the wireless communication by the Wi-Fi communication unit 13.

Next, the control unit 11 obtains the received signal strength of the radio wave (step S505). That is, the Wi-Fi communication unit 13 includes an unillustrated measurement device for the received signal strength of the radio wave, and the control unit 11 obtains the output of the measurement device to specify the received signal strength of the radio wave by the function of the apparatus information obtaining unit 11a. In addition, the control unit 11 records the received signal strength of the radio wave in the memory. In the case were the received signal strength of the radio wave is recorded in the memory, the printing apparatus 10 takes a state in which information indicating the signal strength of the radio wave transmitted from the information processing apparatus 20 is recorded as the apparatus information as apparatus information $I_2$ indicated by a two-dot chain line in FIG. 8.

In the present embodiment, as shown in FIG. 8, the received signal strength of the radio wave is described in a positive value of a ratio to a reference strength. The received signal strength of the radio wave may be expressed in other various forms. For example, the received signal strength of the radio wave may be defined by an attenuation rate (negative value) with respect to the received signal strength of a reference radio wave. In the present embodiment, the packet for confirmation of signal strength is a packet including a MAC address. Therefore, in the present embodiment, the control unit 11 records the apparatus information indicating the received signal strength of the radio wave in association with the MAC address of a device from which the apparatus information has been transmitted. In the present embodiment, since other apparatus information (such as apparatus information $I_1$ shown in FIG. 8) also includes the MAC address, whether or not the two pieces of apparatus information have been transmitted from the same information processing apparatus 20 can be specified on the basis of the MAC address.

Next, the control unit 11 determines, by the function of the frequency band selection unit 11b, whether or not the information processing apparatus 20 supports the 5.0 GHz band (step S510). That is, the control unit 11 refers to the apparatus information, and specifies the frequency band supported by the information processing apparatus 20 from which the packet received in step S500 has been transmitted. Then, the control unit 11 determines that the information processing apparatus 20 supports the 5.0 GHz band in the case where the frequency band supported by the information processing apparatus 20 includes the 5.0 GHz band.

In the case where it is determined in step S510 that the information processing apparatus 20 supports the 5.0 GHz band, the control unit 11 determines, by the function of the frequency band selection unit 11b, whether or not the received signal strength of the radio wave is equal to or greater than a predetermined value (step S515). That is, the control unit 11 refers to the apparatus information, and specifies the received signal strength of the radio wave received from the information processing apparatus 20 from which the packet received in step S500 has been transmitted. Then, the control unit 11 compares the received signal strength of the radio wave with a predetermined value (for example, 60 dB).

In the case where it is determined in step S515 that the received signal strength of the radio wave is equal to or greater than the predetermined value, the control unit 11 selects the 5.0 GHz band by the function of the frequency band selection unit 11b (step S520). In contrast, in the case where it is not determined in step S510 that the information processing apparatus 20 supports the 5.0 GHz band or where it is not determined in step S515 that the received signal strength of the radio wave is equal to or greater than the predetermined value, the control unit 11 selects the 2.4 GHz band by the function of the frequency band selection unit 11b (step S525).

As described above, in the present embodiment, the control unit 11 is configured to select the 5.0 GHz band in the case where the information processing apparatus 20 supports the 5.0 GHz band, unless the received signal strength of the radio wave is insufficient. Therefore, in the case where the information processing apparatus 20 supports the 5.0 GHz band in which communication can be performed at a higher speed, the 5.0 GHz band is used and the communication can be performed at a high speed.

However, in the case where the received signal strength of the radio wave is lower than the predetermined value and the 5.0 GHz band is used, the stability and speed of communication may be sometimes degraded due to, for example, increase in the number of packets whose communication have been failed. Therefore, the control unit 11 selects the 5.0 GHz band in the case where the received signal strength of the radio wave is equal to or greater than the predetermined value, and selects the 2.4 GHz band in the case where the received signal strength of the radio wave is smaller than the predetermined value. Thus, the frequency band can be selected in such a manner as not to cause the degradation in the stability and speed of the communication.

In the case where the 5.0 GHz band is selected in step S520, the control unit 11 determines whether or not the information processing apparatus 20 supports channel bonding (step S530). That is, the control unit 11 refers to the apparatus information, and determines whether or not channel bonding is supported by the information processing apparatus 20 from which the packet received in step S500 has been transmitted.

In the case where it is not determined in step S530 that channel bonding is supported, the control unit 11 activates the SoftAP function in a channel with the fewest access points (step S535). That is, the control unit 11 obtains the number of SSIDs of each channel by referring to information about the 5.0 GHz band in the information whose statistics have been taken in step S315. Then, the control unit 11 regards a channel with the smallest number of SSIDs as the channel with the fewest access points, and selects this channel. In the case where a plurality of channels are tied for the channel with the smallest number of SSIDs, one of the plurality of channels is selected.

For example, in the statistics of channels of 5.0 GHz shown in FIG. 7, one of channels 40, 48, 52, 56, and 64 is selected. The activation of the SoftAP function is performed in a similar manner to step S300 except that the frequency band is the 5.0 GHz band in step S535. Therefore, the control unit 11 takes a state of controlling the Wi-Fi communication unit 13 to output a Wi-Fi beacon at regular intervals by using the channel with the smallest number of SSIDs in the 5.0 GHz band. According to the configuration described above, wireless communication can be performed by using a channel that is not crowded.

In contrast, in the case where it is determined in step S530 that channel bonding is supported, the control unit 11 activates the SoftAP function in a channel in which channel bonding is available (step S540). Channel bonding is a format in which wireless communication is performed by using both of two channels adjacent to each other in the 5.0 GHz band. For example, a format in which both of channels 36 and 40 are used is possible. The control unit 11 selects two adjacent channels, and activates the SoftAP function in a state in which channel bonding is performed. Of course, the control unit 11 may select a channel such that access points for the channel is the fewest in a state in which channel bonding is performed. The activation of the SoftAP function is similar to step S535 except that channel bonding is performed. According to the configuration described above, high-speed communication can be performed as a result of the channel bonding.

In the case where the 2.4 GHz band is selected in step S525, the control unit 11 activates the SoftAP function in a channel with the fewest access points (step S545). That is, the control unit 11 obtains the number of SSIDs of each channel by referring to information about the 2.4 GHz in the information whose statistics have been taken in step S315. Then, the control unit 11 regards a channel with the smallest number of SSIDs as the channel with the fewest access points, and selects this channel. In the case where a plurality of channels are tied for the channel with the smallest number of SSIDs, one of the plurality of channels is selected. For example, in the statistics of channels of 2.4 GHz shown in FIG. 7, one of channels 2 to 5, 7 to 10, and 12 to 14 is selected.

To be noted, when selecting the channel with the fewest access points, interference of a radio wave may be taken into consideration. That is, in the 2.4 GHz band, since frequencies of radio waves corresponding to different channels overlap one another, the channel is sometimes selected so as to avoid the overlap. For example, a configuration in which the channel 6 or 11 is preferentially selected in the case where the channel 1 has been already selected is possible. In the case of such a configuration, channels may be divided into groups, and a channel may be selected such that a channel belonging to a group with the fewest access points may be selected. For example, in the case where channels 1 to 3 are regarded as a group 1, channels 4 to 8 are regarded as a group 2, and channels 9 to 13 are regarded as a group 3 in the example of FIG. 7, the number of access points for the group 1 is 1, the number of access points for the group 2 is 3, and the number of access points for the group 3 is 2. In this case, the control unit 11 selects a channel of the group 1.

Here, the activation of the Soft AP function is also similar to step S300. Since the frequency band is the 2.4 GHz band in step S545, the control unit 11 takes a state of controlling the Wi-Fi communication unit 13 to output a Wi-Fi beacon at regular intervals by using the channel with the smallest number of SSIDs in the 2.4 GHz band. According to the configuration described above, wireless communication can be performed by using a channel that is not crowded.

When any one of steps S535, S540, and S545 is executed, the printing apparatus 10 takes the state of transmitting a Wi-Fi beacon of the selected frequency band through the selected channel at regular intervals. In this state, the information processing apparatus 20 transmits the printing data to the printing apparatus 10 in step S425 or S435. That is, in the case where the channel selected in the processing of step S545 is the same as the previous channel, the information processing apparatus 20 transmits the printing data in step S425 by using the already-established connection. In addition, in the case where the channel selected in the processing of step S545 is different from the previous channel or where the 5.0 GHz band has been selected and steps S535 and S540 have been executed, the information processing apparatus 20 specifies, by the scan of step S430, the frequency band and channel selected by the printing apparatus 10, and transmits the printing data to the printing apparatus 10 in step S435. Therefore, the control unit 11 receives the printing data transmitted from the information processing apparatus 20 (step S550), and controls the printing unit 15 to perform printing on the basis of the printing data (step S555). As a result of this, the printing data can be obtained via the wireless communication through the frequency band and channel selected by the printing apparatus 10, and printing can be completed.

4. Other Embodiments

Of course, the technical scope of the invention is not limited to the embodiment described above, and various modifications can be made within the gist of the invention. For example, in the flowcharts shown in the embodiment described above, the order of steps can be switched, and some steps may be omitted or replaced. Examples of this include a configuration in which the step S510 is omitted, a configuration in which step S515 is omitted, and a configuration in which steps S530 and S540 are omitted. In addition, the apparatus that functions as the wireless communication apparatus is not limited to a printing apparatus and may be another arbitrary apparatus, for example, a scanner or a multifunctional printer.

The apparatus information obtaining unit may be in any configuration as long as the apparatus information obtaining unit is capable of obtaining apparatus information corresponding to an information processing apparatus with which the wireless communication apparatus communicates. The information processing apparatus may be any apparatus as long as the information processing apparatus is capable of communicating with the wireless communication apparatus by using at least one of the first frequency band and the second frequency band. The information processing apparatus may be provided in any number as long as one or more information processing apparatuses are provided, and a plurality of information processing apparatuses may be provided. In addition, the information processing apparatus may be any apparatus as long as the information processing apparatus is capable of performing some kind of information processing, and various apparatuses other than the mobile terminal described above can be the information processing apparatus. For example, desktop computers and various products (for example, home electrical appliances) incorporating computers can be the information processing apparatus.

The apparatus information is information corresponding to the information processing apparatus with which the wireless communication apparatus communicates, and includes at least information for determining the frequency band of a radio wave to be used for wireless communication. The information for determining the frequency band may be information indicating the frequency band supported by the information processing apparatus as in the above embodiment, information indicating a frequency band not supported by the information processing apparatus, or information indirectly indicating a supported (or not supported) frequency band (for example, a number indicating a frequency band). Of course, the apparatus information may also include information other than the information for determining the frequency band.

The frequency band selection unit may be in any configuration as long as the frequency band selection unit is capable of selecting, on the basis of the apparatus information, either one of a first frequency band and a second frequency band corresponding to higher frequency than the first frequency band. That is, the frequency band selection unit may be in any configuration as long as the frequency band selection unit is capable of selecting, on the basis of the apparatus information of each information processing apparatus with which the wireless communication apparatus communicates, a frequency band to be used in the case of performing wireless communication with each information processing apparatus.

The first frequency band and the second frequency band may be any frequency bands as long as these two are at least partially different from each other and wireless communication can be performed in accordance with a wireless communication standard using each frequency band. The bandwidth of each frequency band and the number and bandwidth of channels belonging to each frequency band are not limited. In addition, the protocol for the wireless communication or the like is neither limited. The number of frequency bands that can be selected by the wireless communication unit may be at least two, and a configuration in which the wireless communication unit can select three or more frequency bands may be also employed.

The wireless communication unit may be in any configuration as long as the wireless communication unit is capable of performing wireless communication with the information processing apparatus by using the selected frequency band. That is, the wireless communication unit is capable of using both of the first frequency band and the second frequency band, and is capable of performing wireless communication using each frequency band. As described above, the wireless communication unit may be in any configuration as long as the wireless communication unit is capable of selecting the frequency band of wireless communication in accordance with the information processing apparatus with which the wireless communication apparatus communicates, in a situation in which a frequency band can be selected.

The wireless communication standard different from that of the wireless communication unit may be any wireless communication standard as long as the apparatus information can be obtained without using the wireless communication by the wireless communication unit by using the standard different from the wireless communication standard used by the wireless communication unit. Therefore, the wireless communication standard different from that of the wireless communication unit may be various wireless communication standards other than BLE described above.

For example, in a configuration in which the wireless communication unit is capable of performing wireless communication in accordance with the Wi-Fi standard, the wireless communication standard different from that of the wireless communication unit may be, for example, ZigBee (ZigBee is a registered trademark). In addition, in a configuration in which the wireless communication unit is capable of performing wireless communication in accordance with Bluetooth 3.0 or older standard, the wireless communication standard different from that of the wireless communication unit may be ZigBee or BLE.

To be noted, to obtain the apparatus information without using the wireless communication by the wireless communication unit by using the wireless communication standard different from that of the wireless communication unit, the wireless communication standard different from that of the wireless communication unit is preferably a standard whose power consumption is smaller than that of the wireless communication standard of the wireless communication unit. In addition, the same frequency band may be used in different wireless communication standards like BLE and Wi-Fi. In addition, the configuration of the apparatus information is not limited to the configuration in which the apparatus information is obtained by using the wireless communication standard different from that of the wireless communication unit, and may be a configuration in which the apparatus information is obtained by using the same wireless communication standard as the wireless communication unit, and may be a configuration in which the apparatus information is obtained both by using the wireless communication standard different from that of the wireless communication unit and by using the same wireless communication standard as the wireless communication unit.

Further, a configuration in which the frequency band selection unit selects the second frequency band in a case where the number of information processing apparatuses capable of performing wireless communication by using the first frequency band in accordance with the wireless communication standard different from that of the wireless communication unit is equal to or greater than a reference number, and selects the first frequency band in a case where the number of the information processing apparatuses is smaller than the reference number may be employed. For example, in the configuration shown in FIG. 1 described above, the number of information processing apparatuses that perform wireless communication in accordance with the BLE standard can be specified when the printing apparatus 10 obtains the BLE beacon via wireless communication according to the BLE standard and specifies the number of devices from which the BLE beacon is transmitted. Then, in the case where the number of information processing apparatuses that perform wireless communication in accordance with the BLE standard is excessively large, it can be assumed that there is a higher possibility of radio wave interference in the 2.4 GHz band, which is used in the BLE standard, than in the 5.0 GHz band.

Therefore, in the case where the control unit 11 is configured to specify, on the basis of the BLE beacon, the number of information processing apparatuses that perform wireless communication in accordance with the BLE standard, and determine the frequency band by comparing the number with a reference number, use of the 2.4 GHz band can be avoided in the case where there is a high possibility of radio wave interference. The reference number may be any number as long as the reference number serves as an index for determining whether the number of information processing apparatuses that perform wireless communication in the first frequency band is large or small. For example, the reference number may be determined in advance such that radio wave interference is regarded as being likely to occur when the number of information processing apparatus is equal to or greater than the reference number and that radio interference is regarded as being not likely to occur when the number of information processing apparatus is smaller than the reference number. The reference number may be determined by various methods, and can be determined by, for example, statistics of occurrence of radio wave interference.

The received signal strength of a radio wave transmitted from the information processing apparatus in accordance with the same wireless communication standard as the wireless communication unit may be an index indicating a degree of stability of communication between the wireless communication apparatus and the information processing apparatus. Therefore, the received signal strength may be the received signal strength itself, or a value corresponding to the received signal strength (for example, the distance between the wireless communication apparatus and the information processing apparatus). The predetermined value compared with the received signal strength may be any value as long as the degree of stability of the wireless communication can be regarded as being within an acceptable range when the received signal strength is equal to or greater than the predetermined value and the degree of stability of the wireless communication can be regarded as being out of the acceptable range when the received signal strength is smaller than the predetermined value. The predetermined value may be determined by various methods, and can be determined by, for example, statistics of the degree of stability of the wireless communication. Of course, the apparatus information may include information other than the received signal strength of the radio wave, and the apparatus information including various information may be obtained in one time of wireless communication or in a plurality of times of wireless communication.

As a configuration to determine whether or not the received signal strength is equal to or greater than the predetermined value by using a value corresponding to the received signal strength, various configurations can be employed instead of the embodiment described above. For example, a configuration in which information indicating transmitted signal strength of the radio wave output from the information processing apparatus is transmitted via wireless communication and the received signal strength of the radio wave transmitted via the wireless communication is measured by the wireless communication apparatus may be employed. In this case, when a value (degree of attenuation) obtained by subtracting the received signal strength by the transmitted signal strength is equal to or greater than a reference value, the received signal strength is regarded as being equal to or greater than the predetermined value, and the second frequency band is selected.

In addition, in a configuration in which the information processing apparatus outputs a radio wave at a predetermined strength, the received signal strength of a radio wave received by the wireless communication apparatus in the case where the distance between the information processing apparatus and the wireless communication apparatus is equal to a reference distance (for example, 1 m) may be defined as the reference strength. In this case, information indicating the reference strength is transmitted from the information processing apparatus via wireless communication, and the received signal strength of the radio wave is measured by the printing apparatus in a real environment. Then, when the value (degree of attenuation) obtained by subtracting the received signal strength by the reference strength is equal to or greater than the reference value, the received signal strength is regarded as being equal to or greater than the predetermined value, and the second frequency band is selected.

When obtaining the received signal strength of the radio wave transmitted from the information processing apparatus in accordance with the same wireless communication standard as the wireless communication unit, the received signal strength of the wireless communication in the first frequency band (2.4 GHz band) as the embodiment described above, or the received signal strength of the wireless communication in the second frequency band may be obtained. In the latter case, whether or not to perform wireless communication in the second frequency band can be determined on the basis of an actually measured value related to the wireless communication in the second frequency band. Therefore, whether or not wireless communication in the second frequency band will be stable can be determined on the basis of a more direct value.

In the embodiment described above, an example in which various processes are performed by the CPU (processor) included in the control unit 11 and the CPU included in the control unit 21 has been described. Here, in this specification, the CPU may be constituted by one or a plurality of CPUs, or may be constituted by one or a plurality of integrated circuits (for example, application specific integrated circuit (ASIC)). In addition, the CPU may be constituted by a combination of one or a plurality of CPUs and one or a plurality of integrated circuits.

The entire disclosure of Japanese Patent Application No. 2017-162018, filed Aug. 25, 2017 is expressly incorporated by reference herein.

What is claimed is:

1. A wireless communication apparatus comprising:
   an apparatus information obtaining unit that obtains apparatus information corresponding to an information processing apparatus with which the wireless communication apparatus communicates;
   a frequency band selection unit that selects, on a basis of the apparatus information, either one of a first frequency band and a second frequency band corresponding to higher frequency than the first frequency band, wherein the apparatus information obtaining unit obtains the apparatus information from the information processing apparatus in accordance with a wireless communication standard different from a wireless communication standard of the wireless communication unit; and
   a wireless communication unit that performs wireless communication with the information processing apparatus by using the selected frequency band, wherein the frequency band selection unit selects the second frequency band in a case where a number of information processing apparatuses capable of performing wireless communication by using the first frequency band in accordance with the wireless communication standard different from the wireless communication standard of the wireless communication unit is equal to or greater than a reference number, and selects the first frequency band in a case where the number of the information processing apparatuses is smaller than the reference number.

2. The wireless communication apparatus of claim 1, wherein the wireless communication standard different from the wireless communication standard of the wireless communication unit is Bluetooth Low Energy standard.

3. A wireless communication apparatus comprising:
   an apparatus information obtaining unit that obtains apparatus information corresponding to an information processing apparatus with which the wireless communication apparatus communicates;
   a frequency band selection unit that selects, on a basis of the apparatus information, either one of a first frequency band and a second frequency band corresponding to higher frequency than the first frequency band; and
   a wireless communication unit that performs wireless communication with the information processing apparatus by using the selected frequency band,
   wherein the apparatus information includes a received signal strength of a radio wave transmitted from the information processing apparatus in accordance with the same wireless communication standard as the wireless communication unit, and
   wherein the frequency band selection unit selects the second frequency band in a case where the received signal strength is equal to or greater than a predetermined value, and selects the first frequency band in a case where the received signal strength is smaller than the predetermined value.

4. The wireless communication apparatus according to claim 3, wherein the apparatus information obtaining unit obtains the received signal strength by performing wireless communication with the information processing apparatus by using the first frequency band in accordance with the same wireless communication standard as the wireless communication unit.

5. The wireless communication apparatus according to claim 3, wherein the apparatus information obtaining unit obtains the received signal strength by performing wireless communication with the information processing apparatus by using the second frequency band in accordance with the same wireless communication standard as the wireless communication unit.

6. A wireless communication apparatus comprising:
   an apparatus information obtaining unit that obtains apparatus information corresponding to an information processing apparatus with which the wireless communication apparatus communicates;
   a frequency band selection unit that selects, on a basis of the apparatus information, either one of a first frequency band and a second frequency band corresponding to higher frequency than the first frequency band; and
   a wireless communication unit that performs wireless communication with the information processing apparatus by using the selected frequency band,
   wherein the wireless communication unit obtains, for each channel for wireless communication and by scanning access points that perform wireless communication by using the selected frequency band, a number of access points that perform wireless communication, and performs wireless communication by using a channel having the smallest number of access points that perform wireless communication.

7. The wireless communication apparatus according to claim 6,
   wherein the apparatus information obtaining unit obtains the apparatus information including information indicating whether or not the information processing apparatus supports channel bonding, and
   wherein the wireless communication unit determines, on the basis of the apparatus information, whether or not the information processing apparatus supports channel bonding, selects a channel in which channel bonding is available in a case where it has been determined that the information processing apparatus supports channel bonding, and selects the channel having the smallest number of access points that perform wireless communication in a case where it has been determined that the information processing apparatus does not support channel bonding.

8. A method of controlling a wireless communication apparatus that performs wireless communication with an information processing apparatus, the method comprising:
   obtaining apparatus information corresponding to the information processing apparatus with which the wireless communication apparatus communicates, wherein apparatus information is obtained in accordance with a wireless communication standard different from a wireless communication standard of the wireless communication unit;

selecting, on a basis of the apparatus information, either one of a first frequency band and a second frequency band corresponding to higher frequency than the first frequency band wherein the second frequency band is selected in a case where a number of information processing apparatuses capable of performing wireless communication by using the first frequency band in accordance with the wireless communication standard different from the wireless communication standard of the wireless communication unit is equal to or greater than a reference number, and the first frequency band is selected in a case where the number of the information processing apparatuses is smaller than the reference number; and performing wireless communication with the information processing apparatus by using the selected frequency band.

9. The method of claim 8, wherein the wireless communication standard different from the wireless communication standard of the wireless communication unit is Bluetooth Low Energy standard.

10. A method of controlling a wireless communication apparatus that performs wireless communication with an information processing apparatus, the method comprising:

obtaining apparatus information corresponding to the information processing apparatus with which the wireless communication apparatus communicates, wherein the apparatus information includes a received signal strength of a radio wave transmitted from the information processing apparatus in accordance with the same wireless communication standard as the wireless communication unit;

selecting, on a basis of the apparatus information, either one of a first frequency band and a second frequency band corresponding to a higher frequency than the first frequency band, wherein the second frequency band is selected in a case where the received signal strength is equal to or greater than a predetermined value, and the first frequency band is selected in a case where the received signal strength is smaller than the predetermined value; and performing wireless communication with the information processing apparatus by using the selected frequency band.

11. A method of controlling a wireless communication apparatus that performs wireless communication with an information processing apparatus, the method comprising:

obtaining apparatus information corresponding to the information processing apparatus with which the wireless communication apparatus communicates;

selecting, on a basis of the apparatus information, either one of a first frequency band and a second frequency band corresponding to higher frequency than the first frequency band; and performing wireless communication with the information processing apparatus by using the selected frequency band by obtaining, for each channel for wireless communication and by scanning access points that perform wireless communication by using the selected frequency band, a number of access points that perform wireless communication, and performing the wireless communication by using a channel having the smallest number of access points that perform wireless communication.

* * * * *